(12) United States Patent
Matsuura

(10) Patent No.: US 6,581,716 B1
(45) Date of Patent: Jun. 24, 2003

(54) ALL TERRAIN VEHICLE WITH REAR-FACING REAR ARM BRACKET

(75) Inventor: Tatsuya Matsuura, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/548,774

(22) Filed: Apr. 13, 2000

(30) Foreign Application Priority Data

Apr. 19, 1999 (JP) .......................................... 11-111324

(51) Int. Cl.[7] .............................................. B60K 17/24
(52) U.S. Cl. ...................... 180/379; 74/607; 180/233; 180/210; 180/377; 180/380
(58) Field of Search ................. 180/379, 377, 180/380, 382, 210, 233; 74/606 R, 607; 280/124.128, 124.153

(56) References Cited

U.S. PATENT DOCUMENTS

| | | |
|---|---|---|
| 4,159,752 A | 7/1979 | Kanno |
| 4,327,812 A | 5/1982 | Tominaga et al. |
| 4,327,930 A | 5/1982 | Tominaga et al. |
| 4,360,224 A | 11/1982 | Sato et al. |
| 4,453,616 A | 6/1984 | Porter |
| 4,515,236 A | 5/1985 | Kanamori |
| 4,540,061 A | 9/1985 | Watanabe |
| 4,582,157 A | 4/1986 | Watanabe |
| 4,650,026 A | 3/1987 | Shiraishi |
| 4,666,015 A | 5/1987 | Matsuda et al. |
| 4,691,799 A | 9/1987 | Watanabe |
| 5,279,383 A | 1/1994 | Gustafsson |
| 5,361,864 A | 11/1994 | Tanaka |
| 5,515,940 A | 5/1996 | Shichinohe et al. |
| 5,531,289 A | 7/1996 | Muramatsu |
| 5,782,313 A | 7/1998 | Kurawaki et al. |
| 5,816,356 A | 10/1998 | Jansson et al. |
| 5,839,536 A | 11/1998 | Tanaka |

FOREIGN PATENT DOCUMENTS

JP 2-290790 * 11/1990 ................. 180/210

* cited by examiner

*Primary Examiner*—Eric Culbreth
(74) *Attorney, Agent, or Firm*—Knobbe, Martens, Olson & Bear LLP

(57) ABSTRACT

An all terrain vehicle includes a frame assembly and a rear arm that is pivotally attached to the frame assembly. A rear arm bracket is secured to the frame assembly. A pivot axis is defined through a portion of the rear arm bracket. The pivot axis is disposed rearward of the portion of the frame assembly to which the rear arm bracket is attached. The rear arm is connected to the rear arm bracket such that the width of the rear arm at its connection to the frame assembly is at least as large as the width of the frame assembly at that location.

22 Claims, 4 Drawing Sheets

ALL TERRAIN VEHICLE WITH REAR-FACING REAR ARM BRACKET

PRIORITY INFORMATION

This application is based on and claims priority to Japanese Patent Application No. 11-111,324, filed Apr. 19, 1999, the entire contents of which is hereby expressly incorporated by reference.

BACKGROUND OF THE INVENTION

1. Field of Invention

The present invention generally relates to attaching swing arms to all terrain vehicle frames. More particularly, the present invention relates to coupling forward ends of swing arms to rearward facing portions of such frames.

2. Description of Related Art

All terrain vehicles typically comprise a welded frame assembly to which a variety of components are mounted. For instance, the frame assembly may comprise a left side subassembly and a right side subassembly that are interconnected using cross members. Body panels, such as a front fender subassembly and a rear fender subassembly, are mounted to the frame in the relevant locations. In addition, the frame assembly generally defines an engine compartment within the two side subassemblies. An engine is mounted in the engine compartment and a transmission extends away from the engine. Generally, the transmission is substantially contained within a transmission case that can be integrally formed with a crankcase of the engine.

The all terrain vehicle can be supported by at least two wheels, and often is supported by four wheels. The wheels are connected to the frame assembly through related suspension systems. Generally speaking, the rear wheels are connected to the frame assembly with a rear arm, which is also known as a swing arm. The rear arm extends forward from a location proximate a rear axle and is pivotally connected to the frame assembly. The pivot point is positioned within a region that is encased by the frame assembly. For instance, a pair of down tubes generally define a rear end of the frame assembly and the pivot point is positioned forward of a plane defined through the two down tubes. The pivot point can be defined by brackets that secure the rear arm to the frame assembly.

Because the pivot point of the rear arm is located within the frame assembly, the rear arm must be sized and configured to pass between members of the frame assembly. For instance, the rear arm is often tapered from a portion having a width at least as wide as the frame assembly to a portion that will easily pass between the left side subassembly and the right side subassembly. Such a tapering reduces the strength, and can compromise the integrity, of the rear arm over extended periods of time. Furthermore, stress risers often need to be compensated for in the design of such tapered swing arms.

In addition to the above-discussed integrity issues, positioning the pivot location within an envelope defined by the frame assembly also has other readily identifiable downfalls. For instance, the length of the rear arm must be increased to properly reach to the pivot location if the wheel base length is maintained. In addition, the increased length reduces the strength of the rear arm and requires the rear arm to be strengthened in other manners, such as increasing material thickness or adding gussets. Thus, the longer arm will inevitably weigh more than a similarly designed shorter arm. Moreover, adding components relating to the suspension system into the engine compartment further crowds an already overly crowded region of the vehicle.

SUMMARY OF INVENTION

For at least these reasons, a new mounting arrangement is sought whereby the rear arm can be linked to the frame assembly. The new mounting arrangement should decrease the overall length of the rear arm while maintaining the wheel base length of the vehicle. In addition, the new mounting arrangement should position the suspension components in an area of the vehicle that is less crowded by other components.

Accordingly, one aspect of the present invention involves an all terrain vehicle comprising a frame having a pair of rear tubes, an upper portion and a lower portion. The rear tubes extend from the upper portion to the lower portion with a plane being defined through the rear tubes. At least one rear arm bracket is secured to a portion of the frame. A rear arm is coupled to the frame and extends rearward of the rear arm bracket. At least one rear wheel is supported by a rear portion of the rear arm. The rear arm is capable of articulating relative to the frame about a pivot axis and the pivot axis is disposed rearward of the plane.

Another aspect of the present invention involves an all terrain vehicle comprising a frame and a rear arm. A wheel axle is carried by the rear arm. Means for mounting the rear arm to the frame are provided between said rear arm and said frame. A front end of the rear arm is connected to the means for mounting and the means for mounting comprises a pivot pin that is positioned rearward of the frame.

A further aspect of the present invention involves an all terrain vehicle comprising a frame and a pair of rear arm brackets. Each of the rear arm brackets is secured to a portion of the frame. A rear arm is coupled to the frame and extends rearward of the rear arm brackets. The rear arm comprises a pair of forward tongues and at least one rear wheel axle being supported by a rear portion of the rear arm. The forward tongues are pivotally coupled to the corresponding rear arm brackets. The rear arm is capable of articulating relative to the frame about a pivot axis. An engine is disposed within the frame with a transmission being coupled to the engine. A drive shaft extends from the transmission to the at least one rear axle and a protective housing encases at least a portion of the drive shaft.

BRIEF DESCRIPTION OF THE DRAWINGS

These and other features, aspects and advantages of the present invention will now be described with reference to the drawings of a preferred embodiment, which embodiment is intended to illustrate and not to limit the invention.

DETAILED DESCRIPTION OF THE PREFERRED EMBODIMENTS OF THE INVENTION

Figure 1:
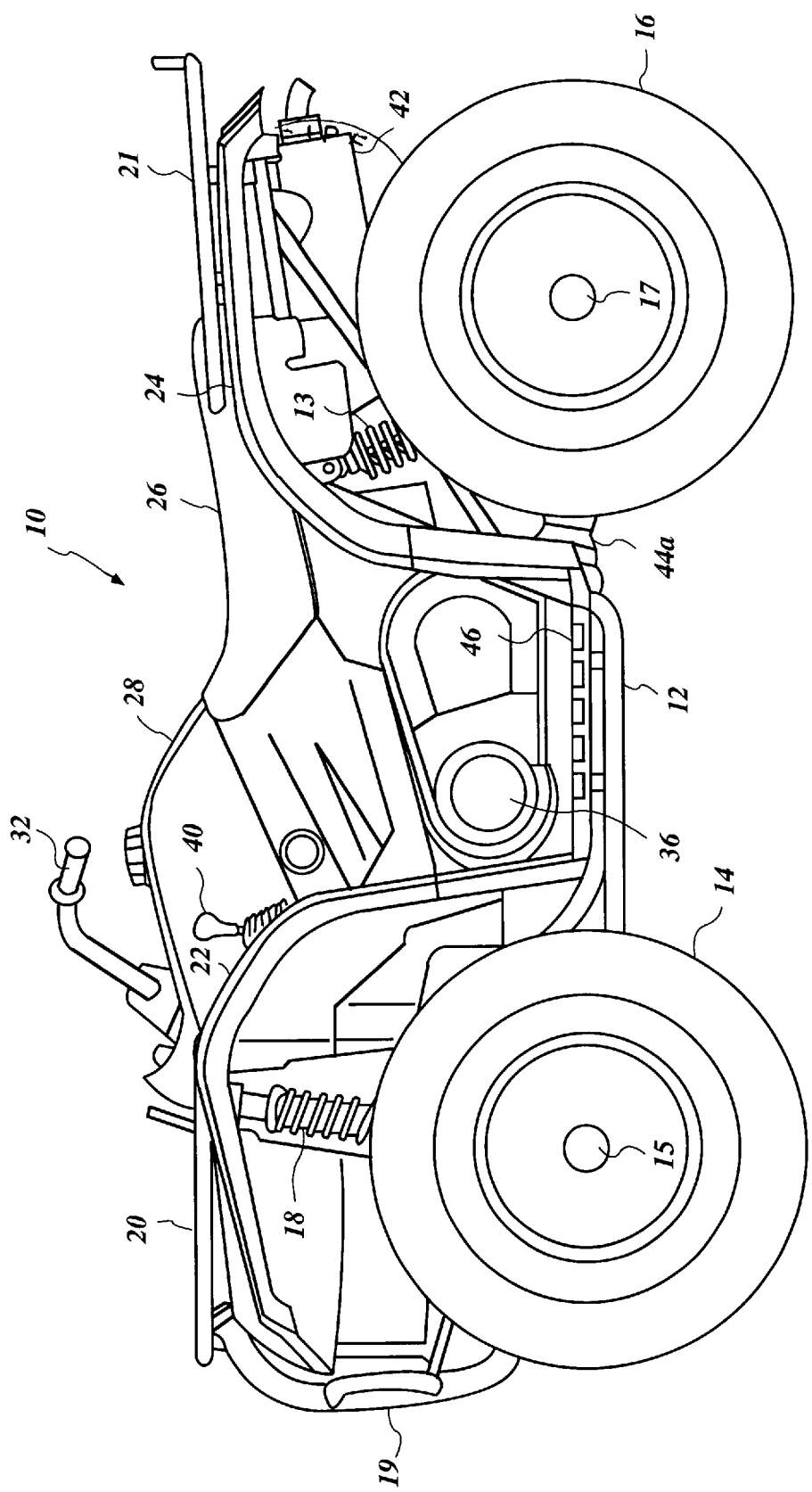
FIG. 1 is a side view of an ATV having a rear suspension constructed in accordance with certain features, aspects and advantages of the present invention.
Figure 2:
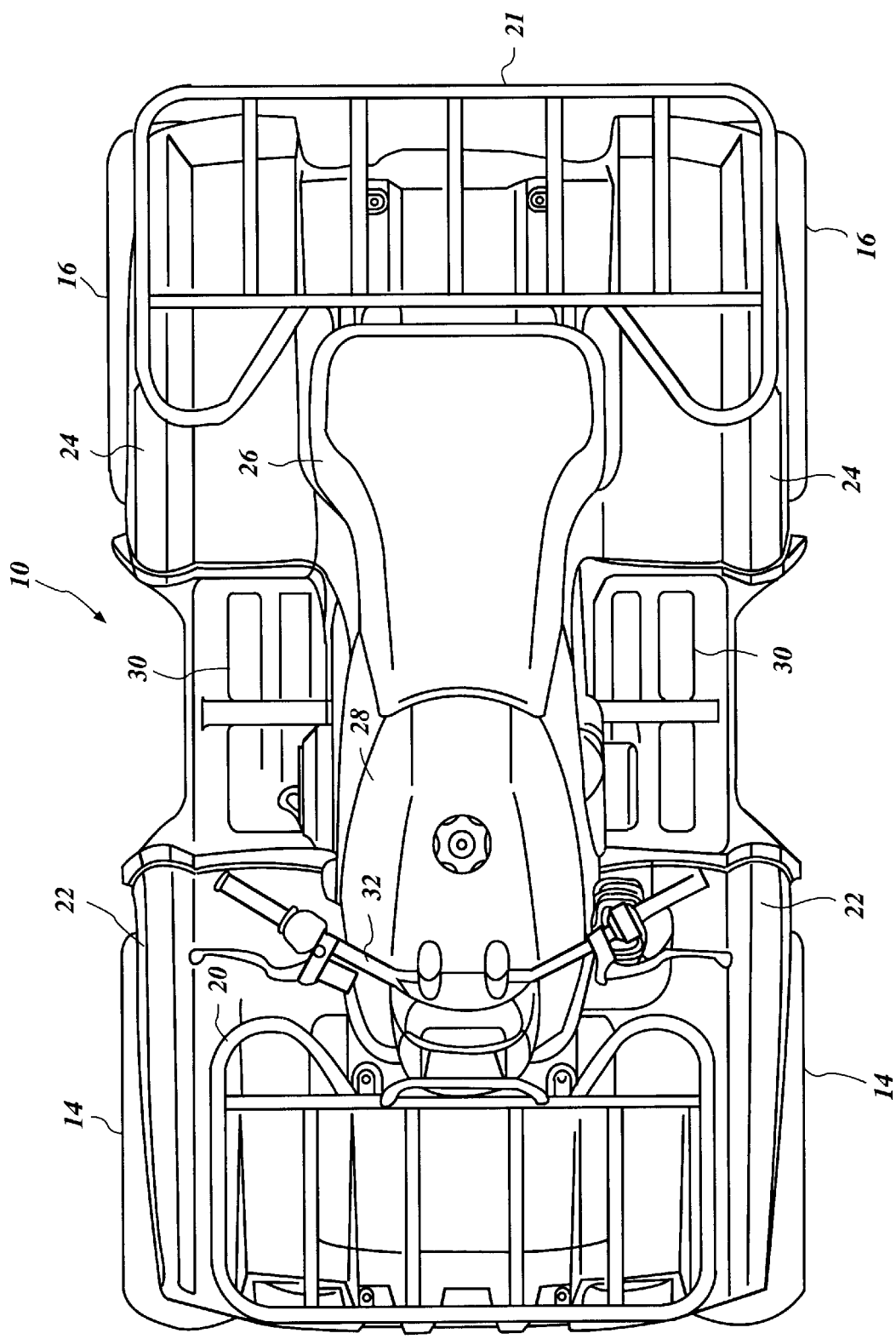
FIG. 2 is a top view of the ATV of FIG. 1.

With initial reference to FIGS. 1 and 2, an all terrain vehicle ("ATV") of the four-wheel type featuring a rear arm mounting assembly is identified generally by the reference numeral 10. The vehicle 10 illustrates only a typical environment in which the present invention may be used. It should become readily apparent to those of ordinary skill in the art that a rear suspension system having certain aspects, features and advantages in accordance with the present invention can also be used in a number of other applications, including but not limited to, three-wheel and two-wheel motorcycles, golf carts, go-carts, automobiles and the like.

In the illustrated arrangement, the vehicle 10 includes a welded-up body frame 12, a pair of front wheels 14 and a pair of rear wheels 16. Preferably, each of the wheels 14, 16 includes a low-pressure balloon-type of tire designed for off-road use. The wheels 14, 16 rotate about at least one front wheel shaft 15 and at least one rear wheel shaft 17 respectively. The shafts 15, 17 are mounted to the frame in any suitable manner.

The frame assembly 12 can comprise any suitable construction. In the illustrated arrangement, the fame assembly 12 comprises a right side subassembly and a left side subassembly. The two subassemblies preferably are joined by a number of crossing members, as is well known to those of skill in the at. Each subassembly comprises an upper portion 12b and a lower portion 12c that am joined by at least a rear down tube 12a. Various other components also form portions of the frame assembly 12 but need not be described to understand the present invention.

The travel of each of the wheels 14, 16 relative to the frame assembly 12 is controlled through corresponding front and rear suspension systems. The front suspension system is conventional and, in some arrangements, such as in the illustrated arrangement, the front wheels 14 are independently suspended. While not shown, the illustrated vehicle preferably comprises a pair of A-arms (not shown) and a pair of front shock absorbers 18. The A-arms preferably extend outward from the frame assembly 12 with each apex being disposed proximate the associated front wheel and each base being pivotally mounted to the frame assembly 12. The shock absorbers 18 preferably angle downward and outward from a mounting plate to a mounting bracket formed proximate a hub carrier of each of the wheels, as is generally known to those of ordinary skill in the art.

The vehicle 10 also includes a body. The body is generally comprised of a front bumper 19, a front cargo rack 20, a rear cargo rack 21, a front fender assembly 22, a rear fender assembly 24, a seat 26 and a fuel tank 28. Each of the body components 19, 20, 21, 22, 24, 26, 28 are carried on and supported by the frame 12 in any suitable manner. For instance, the front bumper 19, which happens to be the forward-most component of the illustrated body, preferably is oriented substantially perpendicular to the longitudinal axis of the vehicle 10. The front cargo rack 20 is positioned generally above the front wheels 14, and is oriented substantially parallel to the operating plane defined by the interface between the ground and the wheels 14, 16. The rear cargo rack 21 is positioned generally above the rear wheels 16, again substantially parallel to the operating plane. The front fender assembly 22 is generally positioned over the front wheels 14 and is attached to the frame assembly 12 in any suitable manner, for instance, with threaded fasteners. Rearward of the front fender assembly 22 are the fuel tank 28 and seat 26. The rear fender assembly 24 is generally positioned behind the seat 26 and substantially over the rear wheels 16. The rear fender assembly is preferably attached to the frame assembly 12 in any suitable manner, such as with threaded fasteners.

In addition, a pair of foot boards 30 preferably are disposed to either side of the frame assembly 12 proximate a portion of the frame assembly 12 that supports the seat 26. More preferably, the foot boards 30 are removably connected to the frame assembly 12 such that the foot boards 30 can be easily removed for maintenance and repair, for instance. The illustrated foot boards 30 are disposed such that a foot of an operator can be disposed on each when the rider straddles the seat 26. Moreover, the foot boards 30 preferably extend from a lower portion of the front fender assembly 22 to a lower portion of the rear fender assembly 24. Such an arrangement better protects the operator from thrown stones, sticks and other debris during movement of the vehicle. Of course, the foot boards can be replaced by foot pegs, nerf bars, mesh netting or the like for some applications.

With continued reference to FIGS. 1 and 2, the seat 26 preferably accommodates a single rider seated in a generally straddle fashion (i.e., having one leg on each of the steps 30) or plurality of riders seated in a generally tandem straddle fashion (i.e., one behind the other). An access opening or storage compartment (not shown) may be at least partially arranged beneath the seat 26. Thus, the seat 26 or a portion of the seat 26 may be mounted to a removable access opening cover such that the seat 26 or the portion of the seat 26 may be removed or opened about a hinge to provide easy access to an engine compartment, storage compartment or other components, such as, for instance, an air cleaner or the like.

The fuel tank 28 preferably is interposed between a forward end of the seat 26 and a handle bar assembly 32. The handle bar assembly 32 may carry the throttle controls, the choke controls and other operator controls. The illustrated handle bar assembly 32 is connected to a front steering mechanism via a steering column (not shown). The steering column and the handle bar assembly 32 operate to steer the front wheels 14 in any suitable manner.

An internal combustion engine, indicated generally by the reference numeral 36, powers the vehicle 10. As is known, the engine 36 may comprise any number of engine configurations. For instance, the engine 36 may operate on the two-stroke principle or the four-cycle principle. The engine 36 has as few as one cylinder or more than two cylinders. The engine 36 preferably drives both the front wheels 14 and the rear wheels 16 through a transmission (not shown), which may be configured to shift between two-wheel drive and four-wheel drive modes. The rider actuates shift lever 40, which is placed between the rider's left-side front fender assembly 22 and the fuel tank 28, to move the transmission through its various gears (not shown). Engine output is transmitted to a rear differential (not shown) through a substantially sealed transmission pipe 44a, discussed in more detail below.

An exhaust muffler 42 is connected both to the frame 12 in any suitable manner and is in communication with the cylinders of the engine 36 to reduce the sound of the engine in a manner that is well known.

With continued reference to FIGS. 1 and 3, the attachment of the rear wheel shaft 17 to the body frame 12 will be discussed in detail. As is known, the illustrated rear wheel shaft 17 is pivotally connected to the body frame 12 by at least one shock absorber 13 and the rear arm 44, The rear shock absorber 13, which is pivotally connected to the frame 12, extends from a portion of the fame 12 to the rear arm 44 or another member connected to the rear arm 44, such as a differential or gearbox 46. As depicted, the rear shock absorber is connected to the gearbox 46, which is connected to the rear wheel shaft 17, in tun. The rear shock absorber 13 preferably inclines in a forward direction to increase the range of movement of the rear wheels relative to the frame assembly 12 while not substantially increasing the overall vertical stance of the vehicle 10.

The rear arm 44, which is connected to the gearbox, also is connected to a down-tube portion 12a of the body frame 12 in front of the rear wheel shaft 17. The rear arm 44 also is connected rearward of a juncture between the down-tubes 12a and the lower frame rails 12c in the illustrated arrangement. More particularly, the rear arm 44 preferably is connected to the frame rearward of a plane P defined through corresponding portions of the down tubes 12c.

Figure 3:
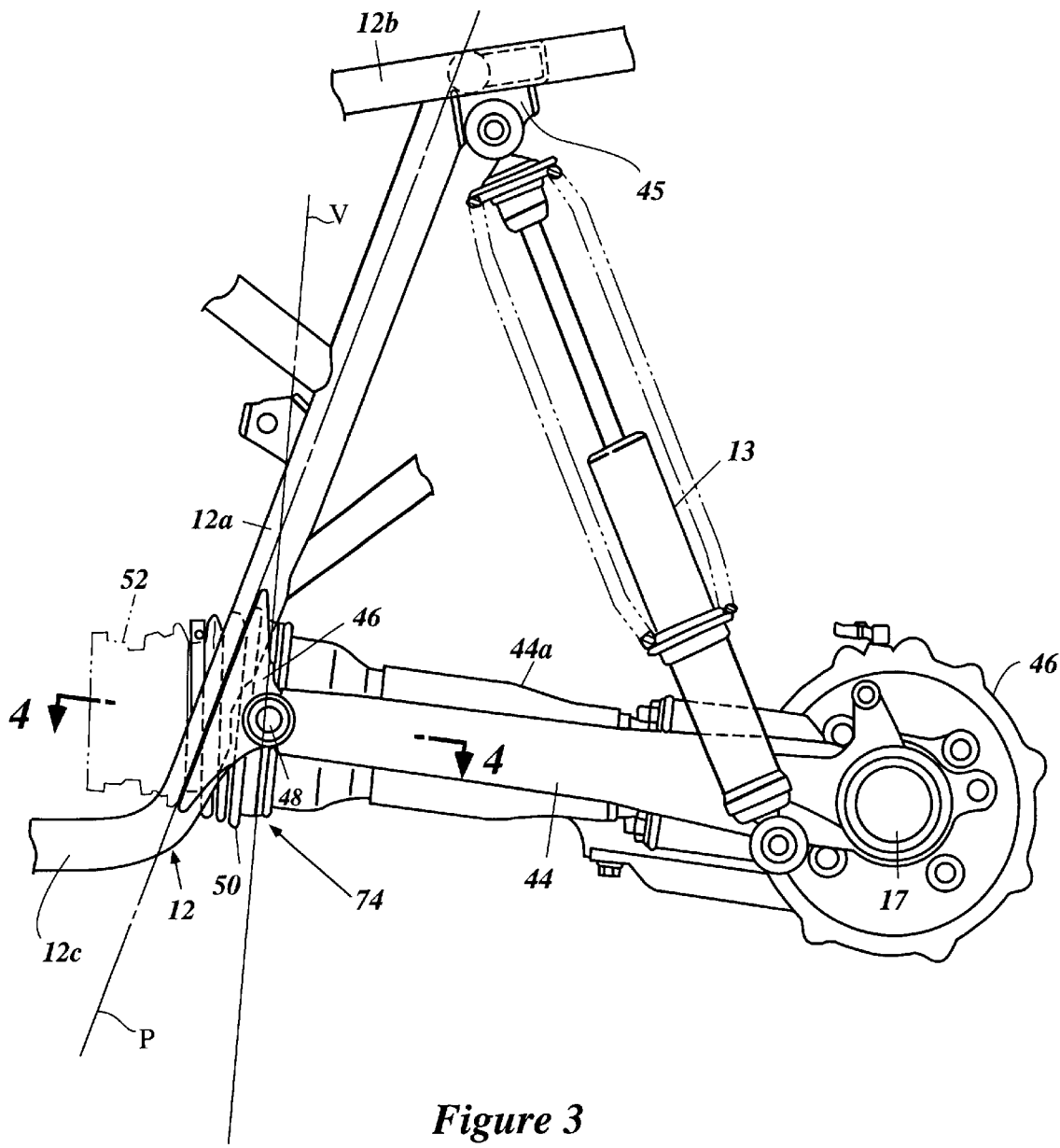
FIG. 3 is a broken-out elevation view of the rear suspension of the ATV in FIG. 1, with some components illustrated with hidden lines.

With continued reference to FIG. 3, the down tube portion 12a of the body frame 12 preferably extends in a forward and downward direction from a set of seat rails 12b. In this arrangement, the down tube 12a connects to the seat rails 12b of the frame assembly 12 just ahead of a set of mounting brackets 45 for the rear shock absorbers 13.

With continued reference to FIG. 3, the rear arm 44 is pivotally connected to the down tube 12a with a rear arm bracket 46. The illustrated rear arm bracket 46 is secured to a lowermost portion of the down tube 12, preferably proximate the lower frame rails 12b. More preferably, the rear arm brackets are disposed with a pivot shaft 45 extending rearward of the down tube 12a. In this manner, the breadth of the rear arm is not reduced to pass within the width of the fame assembly 12 defined by the down tubes 12a. Instead, in accordance with one aspect of the present invention, the rear arm 44 can have a breadth at least equal to the breadth of the frame assembly 12 as defined proximate the connection to the rear arm 44. In some arrangements, this breadth is defined as the breadth proximate the intersection of the down tubes 12a and the lower frame rails 12b. The connection between the brackets 46 and the frame assembly 12, in the illustrated arrangement, may be established in any suitable manner, such as welding. It is also anticipated that the brackets 46 can be secured to the frame using an intermediate structure, component or assembly.

The rear arm 44 preferably is pivotally connected to the frame assembly 12 by the pivot shaft 48, which is a bolt in the illustrated arrangement. As will be recognized, a pair of rear arm brackets 46, and, accordingly, pivot shafts 48 are used in the illustrated arrangement. These paired elements correspond to a pair of forward tongues 70 that form a portion of the illustrated rear arm 44. Of course, one or more than two such assemblies also can be used. The use of two, however, advantageously results in better torsional stability without decreasing the available lateral area for drive shaft passage. Also shown in FIG. 3 is a generally sealed transmission pipe 44a, which extends between the illustrated gearbox 46 and a portion of the engine/transmission assembly (not shown). The drive shaft (not shown) preferably extends through this pipe 44a between the gearbox 46 and the transmission. A dust boot 50 and a cover 52 can be placed over the forward end of the sealed transmission pipe 44a to substantially protect the drive shaft, transmission and associated moving components from foreign matter, such as dirt and dust.

Figure 4:
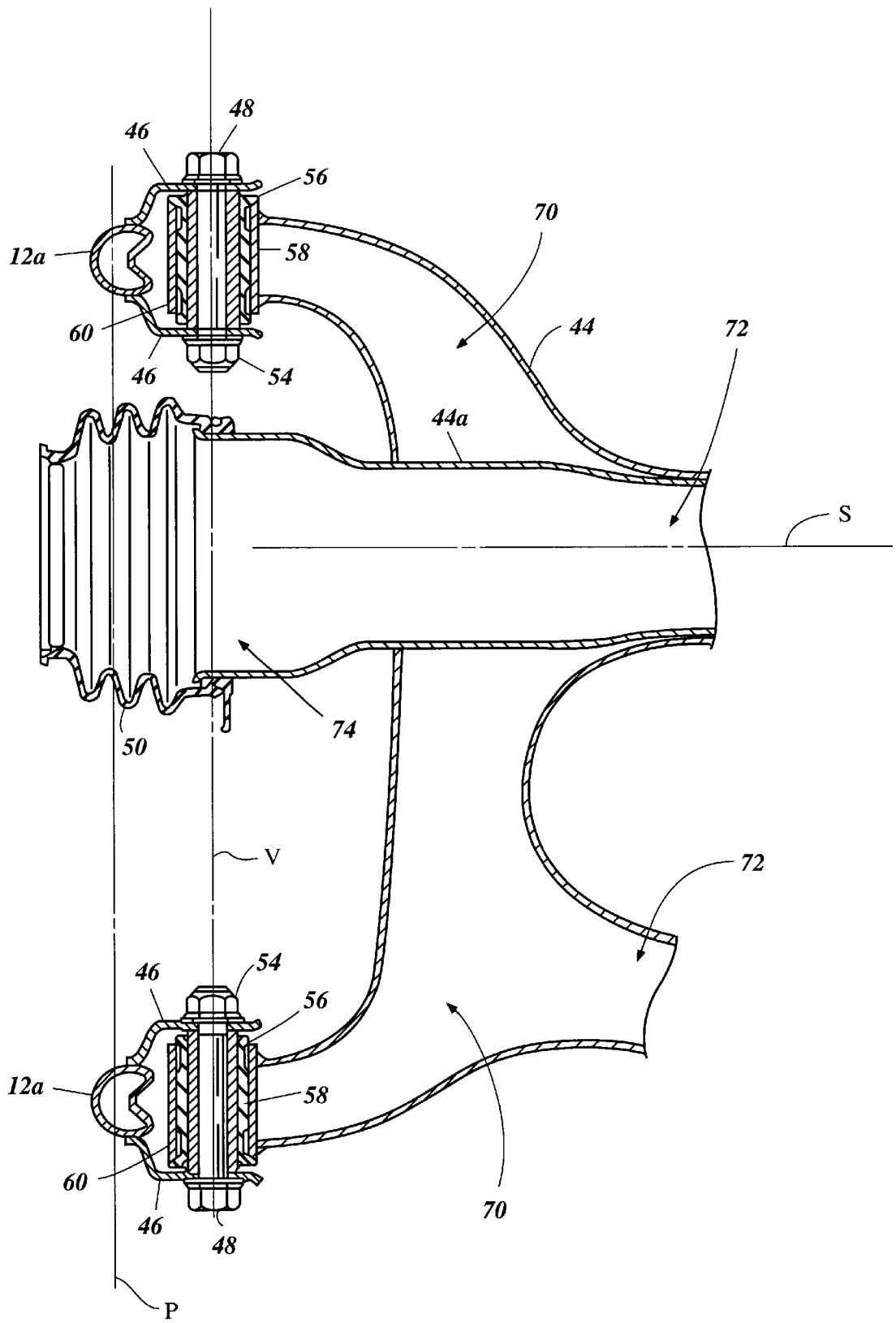
FIG. 4 is a top section view of the coupling of a rear arm to a frame along plane 4—4 in FIG. 3.

With reference now to FIG. 4, which is a sectional view of FIG. 3 taken along plane 4—4 in FIG. 3, the connections of the rear arm brackets 46 and the down tubes 12a are shown. Also shown are the pivot shaft 48, which extend through the brackets 46. Of course, it is well known that another type of shaft also is possible, such as a cotter pin and key arrangement, as well as others. In the illustrated arrangement, nuts 54 preferably am fastened onto the end of pivot shafts 48 to fix them in place.

The connection of the rear arm 44 to the brackets 46 also includes components to decrease wear and, therefore, to increase durability. For instance, a supporting collar 56 extends between the legs of the bracket 46. The collars 56 can be cylinders that encircle the pivot shafts 48. A rubber bushing 58 is disposed about at least a portion of the collar 56. The rubber bushings 58 reduce vibration transfer from the rear wheels to the frame assembly 12. In addition, the rubber bushings absorb some of the pounding that otherwise would be transferred between two metal or rigid components. The connection also comprises a boss pipe 60 that forms a portion of the illustrated swing arm 44. The rubber busing 58, the collar 56 and the pivot shaft 48 all extend through at least a portion of the boss pipes 60. This provides for a smoother ride as the vehicle 10 is driven over uneven terrain. Rear shock absorbers 13 act in concert with pivoting of the rear arm 44 relative to the frame assembly 12 to absorb and mute some of the vertical displacement caused by uneven terrain. Also shown in FIG. 4 is the sealed transmission pipe 44a and dust boot 50 that act as a barrier to reduce the likelihood of foreign matter invading the transmission.

With continued reference to FIG. 4, the pipe 44a advantageously is aligned with one of the illustrated tongues 70. Preferably, the pipe 44a forms a portion of the aligned tongue 70. More preferably, a central axis S of the pipe 44a is aligned with a plane that passes through a generally central portion of both legs 72 of the swing arm 44 and, even more preferably, a generally central portion of both tongues 70. As also illustrated, a forward end 74 of the pipe 44a is preferably positioned substantially in-line with a generally vertical plane V that extends through the pivot pins 48.

Although the present invention has been described in terms of a certain embodiment, other embodiments apparent to those of ordinary skill in the art also are within the scope of this invention. For instance, to eliminate the weakness inherent in a weld bead, the brackets 46 and down-tubes 12a could be integrally made. Also, many variations are possible in the pivot arrangement, such as making the rear arm 44 and the pivot shaft 48 a single unit and incorporating bearing elements into the bracket. Thus various changes and modifications may be made without departing from the spirit and scope of the invention. Moreover, not all of the features aspects and advantages are necessarily required to practice the present invention. Accordingly, the scope of the present invention is intended to be defined only by the claims that follow.

What is claimed is:

1. An all terrain vehicle comprising a frame comprising a pair of rear arm mounting tubes, an engine disposed within said frame, a transmission coupled to said engine, a rear arm comprising a protective tube and a pair of connecting tongues, each connecting tongue terminating in a connecting end, a wheel axle being carried by said rear arm, a drive shaft generally extending between said transmission and said wheel axle, said drive shaft being at least partially housed within said protective tube, and means for mounting said rear arm to said rear arm mounting tubes such that each of said connecting ends is symmetrically mounted with respect to a respective one of said rear arm mounting tubes.

2. The all terrain vehicle as set forth in claim 1, wherein said protective tube comprises a central axis, said central axis being disposed within a plane extending through corresponding portions of said connecting tongues.

3. The all terrain vehicle as set forth in claim 1, wherein said protective tube forms a portion of one of said connecting tongues.

4. The all terrain vehicle as set forth in claim 1, wherein said protective tube terminates at a forward location, said forward location being defined by a generally vertical plane extending through said means for mounting.

5. The all terrain vehicle as set forth in claim 4 further comprising a protective boot that encircles a forward end of said protective tube.

6. The all terrain vehicle as set forth in claim 1, wherein said protective tube forms a portion of said rear arm.

7. An all terrain vehicle having a central axis comprising a frame, a pair of rear arm brackets, each of said rear arm brackets being secured to a portion of said frame, a rear arm being coupled to said frame and extending rearward of said rear arm brackets, said rear arm comprising a pair of legs, a crossing member connecting said legs, a protective housing and a pair of forward tongues, the forward tongues defining a curve extending outwardly from the crossing member to the rear arm brackets, the crossing member being located rearward of said rear arm brackets, at least one rear wheel axle being supported by a rear portion of said rear arm, said forward tongues being pivotally coupled to said corresponding rear arm brackets, said rear arm being capable of articulating relative to said frame about a pivot axis, an engine being disposed within said frame, a transmission being coupled to said engine, a drive shaft extending from said transmission to said at least one rear axle, the protective housing encasing at least a portion of said drive shaft.

8. The all terrain vehicle as set forth in claim 7, wherein said protective housing encases a rearmost portion of said drive shaft.

9. The all terrain vehicle as set forth in claim 7, wherein said protective housing encases a central portion of said drive shaft.

10. The all terrain vehicle as set forth in claim 7, wherein said protective housing comprises a central axis, said central axis being disposed within a plane extending through corresponding portions of said connecting tongues.

11. The all terrain vehicle as set forth in claim 7, wherein said protective housing forms a portion of one of said connecting tongues.

12. The all terrain vehicle as set forth in claim 7 further comprising pivot pins that pivotally couple said forward tongues to said frame, said protective housing terminating at a forward location, said forward location being defined by a generally vertical plane extending through said pivot pins.

13. The all terrain vehicle as set forth in claim 7 further comprising a protective boot that encircles a forward end of said protective tube.

14. The all terrain vehicle as set forth in claim 7, wherein said protective housing forms a portion of said rear arm.

15. An all terrain vehicle comprising a frame, said frame comprising a first rear tube having a first inwardly-facing surface that faces a vertical central longitudinal plane of said vehicle, a second rear tube having a second inwardly-facing surface that faces said central longitudinal plane of said vehicle, a rear tube off-set being defined between said first inwardly facing surface and said second inwardly facing surface, a protective tube having a central axis, a rear arm comprising a rearward portion and a forward portion, the forward portion comprising a first tongue comprising a first forward end and a first outwardly-facing surface that faces away from said central longitudinal plane, the forward portion also comprising a second tongue comprising a second forward end and a second outwardly-facing surface that faces away from said central longitudinal plane, a tongue off-set being defined between said first outwardly-facing surface of said first tongue and the second outwardly-facing surface of said second tongue, a wheel axle being carried by the rearward portion of the rear arm, an engine disposed within said frame, a transmission coupled to said engine, a drive shaft generally extending between said transmission and said wheel axle, said drive shaft being at least partially housed within said protective tube, means for mounting said rear arm to said frame, each of said tongues being coupled to said frame, said tongue offset not being less than the rear tube off-set.

16. The all terrain vehicle of claim 15 further comprising an elastic member that is positioned between the frame and the rear arm.

17. The all terrain vehicle of claim 15, wherein said protective tube comprises a central axis, said central axis being disposed within a plane extending through corresponding portions of said tongues.

18. The all terrain vehicle of claim 15, wherein said protective tube forms a portion of one of said tongues.

19. The all terrain vehicle of claim 15 further comprising a pair of pivot pins about which said tongues are adapted to pivot.

20. The all terrain vehicle of claim 15, wherein said protective tube terminates at a forward location, said forward location being defined by a generally vertical plane extending through said pivot pins.

21. The all terrain vehicle of claim 15 further comprising a protective boot that encircles a forward end of said protective tube.

22. The all terrain vehicle of claim 15, wherein said protective tube forms a portion of said rear arm.

* * * * *